(12) United States Patent
Tilton

(10) Patent No.: US 10,984,577 B2
(45) Date of Patent: *Apr. 20, 2021

(54) OBJECT-AWARE TRANSITIONS

(71) Applicant: APPLE INC., Cupertino, CA (US)

(72) Inventor: James Eric Tilton, Austin, TX (US)

(73) Assignee: Apple Inc., Cupertino, CA (US)

( * ) Notice: Subject to any disclaimer, the term of this patent is extended or adjusted under 35 U.S.C. 154(b) by 514 days.

This patent is subject to a terminal disclaimer.

(21) Appl. No.: 14/962,936

(22) Filed: Dec. 8, 2015

(65) Prior Publication Data
US 2016/0196681 A1 Jul. 7, 2016

Related U.S. Application Data

(63) Continuation of application No. 12/206,217, filed on Sep. 8, 2008, now abandoned.

(51) Int. Cl.
*G06T 13/80* (2011.01)

(52) U.S. Cl.
CPC .................................. *G06T 13/80* (2013.01)

(58) Field of Classification Search
CPC ...... G06F 17/212; G06F 3/01; G06F 16/4393; G06F 40/103; G06T 11/60; G06T 13/80; G06T 13/40; G06T 13/04; Y10S 345/949
See application file for complete search history.

(56) References Cited

U.S. PATENT DOCUMENTS

| | | | |
|---|---|---|---|
| 5,640,522 A | 6/1997 | Warrin | |
| 5,673,401 A | 9/1997 | Volk | |
| 5,687,331 A | 11/1997 | Volk | |
| 5,717,848 A | 2/1998 | Watanabe | |
| 5,917,480 A | 6/1999 | Tafoya | |
| 5,933,150 A | 8/1999 | Ngo | |
| 6,081,262 A | 6/2000 | Gill | |
| 6,091,427 A | 7/2000 | Boezeman et al. | |
| 6,111,590 A | 8/2000 | Boezeman et al. | |
| 6,252,677 B1 | 6/2001 | Hawes | |
| 6,351,265 B1 | 2/2002 | Bulman | |

(Continued)

FOREIGN PATENT DOCUMENTS

| | | |
|---|---|---|
| WO | WO2003052626 | 6/2003 |
| WO | WO2007091081 | 8/2007 |

(Continued)

OTHER PUBLICATIONS www.crystalgraphics.com/presentations PowerPlugs: Transitions, 5 pages, downloaded Apr. 25, 2006.

(Continued)

*Primary Examiner* — Mohamed Abou El Seoud
(74) *Attorney, Agent, or Firm* — Fletcher Yoder PC

(57) ABSTRACT

Techniques for accomplishing slide transitions in a presentation are disclosed. In accordance with these techniques, objects within the slides are identified, automatically or by a user, and each object is individually manipulable during slide transitions. The individual manipulation applied to each object during a transition may also be automatically determined or specified by a user. In certain embodiments, the persistence of an object between slides may be taken into account in the manipulation of the object during slide transition.

16 Claims, 10 Drawing Sheets

(56) References Cited

U.S. PATENT DOCUMENTS

| | | | |
|---|---|---|---|
| 6,369,835 B1* | 4/2002 | Lin | G06Q 10/10 |
| | | | 715/726 |
| 6,396,500 B1* | 5/2002 | Qureshi | G06F 17/30905 |
| | | | 345/418 |
| 6,424,743 B1 | 7/2002 | Ebrahimi | |
| 6,546,397 B1 | 4/2003 | Rempell | |
| 6,573,899 B2 | 6/2003 | Aono | |
| 6,580,438 B1 | 6/2003 | Ichimura | |
| 6,646,655 B1 | 11/2003 | Brandt et al. | |
| 6,674,484 B1 | 1/2004 | Boland et al. | |
| 6,717,591 B1 | 4/2004 | Fiveash | |
| 6,836,870 B2 | 12/2004 | Abrams | |
| 6,957,389 B2 | 10/2005 | Faraday | |
| 7,017,115 B2 | 3/2006 | Hayashi | |
| 7,042,464 B1 | 5/2006 | Paquette | |
| 7,071,943 B2* | 7/2006 | Adler | G06F 3/0481 |
| | | | 345/473 |
| 7,084,875 B2 | 8/2006 | Plante | |
| 7,102,643 B2 | 9/2006 | Moore | |
| 7,155,676 B2 | 12/2006 | Land | |
| 7,165,212 B2 | 1/2007 | Faraday | |
| 7,236,632 B2 | 6/2007 | Erol | |
| 7,246,316 B2 | 7/2007 | Furlong | |
| 7,302,113 B2 | 11/2007 | Pilu et al. | |
| 7,372,991 B2 | 5/2008 | Chen | |
| 7,383,509 B2 | 6/2008 | Foote | |
| 7,428,704 B2 | 9/2008 | Baker | |
| 7,434,153 B2 | 10/2008 | Liu et al. | |
| 7,434,177 B1 | 10/2008 | Ording et al. | |
| 7,443,401 B2 | 10/2008 | Blanco | |
| 7,454,077 B1 | 11/2008 | MacKenzie et al. | |
| 7,467,351 B1 | 12/2008 | Spells | |
| 7,496,833 B1 | 2/2009 | Ten Kate et al. | |
| 7,721,209 B2 | 5/2010 | Tilton | |
| 2002/0191013 A1 | 12/2002 | Abrams | |
| 2003/0090506 A1* | 5/2003 | Moore | G06T 13/80 |
| | | | 715/730 |
| 2003/0160814 A1 | 8/2003 | Brown | |
| 2004/0130566 A1 | 7/2004 | Banerjee | |
| 2004/0218894 A1 | 11/2004 | Harville | |
| 2004/0233201 A1* | 11/2004 | Calkins | G06T 13/00 |
| | | | 345/473 |
| 2005/0041872 A1 | 2/2005 | Yim et al. | |
| 2005/0091672 A1 | 4/2005 | Debique | |
| 2005/0154679 A1 | 7/2005 | Bielak | |
| 2005/0156931 A1 | 7/2005 | Olchevski | |
| 2005/0188311 A1 | 8/2005 | Diesel | |
| 2006/0067578 A1 | 3/2006 | Fuse | |
| 2006/0129933 A1* | 6/2006 | Land | G11B 27/034 |
| | | | 715/723 |
| 2006/0129934 A1 | 6/2006 | Siebrecht | |
| 2006/0136827 A1 | 6/2006 | Villaron | |
| 2006/0167903 A1 | 7/2006 | Smith | |
| 2006/0197764 A1 | 9/2006 | Yang | |
| 2006/0246409 A1 | 11/2006 | Akopian | |
| 2006/0265643 A1 | 11/2006 | Saft | |
| 2006/0265659 A1 | 11/2006 | Collins | |
| 2006/0271871 A1 | 11/2006 | Blaukoph | |
| 2006/0288389 A1 | 12/2006 | Deutscher et al. | |
| 2007/0038937 A1 | 2/2007 | Asakawa | |
| 2007/0081197 A1 | 4/2007 | Omoigui | |
| 2007/0101125 A1 | 5/2007 | Lain et al. | |
| 2007/0101251 A1 | 5/2007 | Lee | |
| 2007/0106927 A1 | 5/2007 | Antley | |
| 2007/0162853 A1 | 7/2007 | Weber | |
| 2007/0226625 A1 | 9/2007 | Cardone et al. | |
| 2007/0245243 A1 | 10/2007 | Lanza | |
| 2007/0277106 A1 | 11/2007 | Takriti | |
| 2007/0300158 A1 | 12/2007 | Kasperkiewicz et al. | |
| 2008/0005652 A1 | 1/2008 | Krishnaswamy | |
| 2008/0192056 A1 | 8/2008 | Robertson et al. | |
| 2008/0250321 A1 | 10/2008 | Lee | |
| 2008/0313214 A1 | 12/2008 | Duhig et al. | |
| 2009/0044123 A1 | 2/2009 | Tilton | |
| 2009/0044136 A1* | 2/2009 | Flider | G11B 27/034 |
| | | | 715/764 |
| 2009/0049075 A1 | 2/2009 | Kim et al. | |
| 2009/0055745 A1 | 2/2009 | Christiansen | |
| 2009/0079744 A1* | 3/2009 | Chen | G06T 13/80 |
| | | | 345/473 |
| 2009/0142737 A1 | 6/2009 | Breig | |
| 2010/0029902 A1 | 2/2010 | Choi et al. | |
| 2010/0218100 A1 | 8/2010 | Simon et al. | |
| 2010/0223554 A1 | 9/2010 | Tilton | |
| 2010/0238176 A1 | 9/2010 | Guo et al. | |
| 2010/0293470 A1 | 11/2010 | Zhao et al. | |
| 2011/0029902 A1 | 2/2011 | Bailey | |
| 2011/0107223 A1 | 5/2011 | Tilton et al. | |
| 2011/0185297 A1 | 7/2011 | Reid et al. | |
| 2012/0280991 A1* | 11/2012 | Maloney | G06T 13/20 |
| | | | 345/420 |
| 2013/0166562 A1* | 6/2013 | Rys | G06F 17/30067 |
| | | | 707/740 |

FOREIGN PATENT DOCUMENTS

| | | |
|---|---|---|
| WO | WO2008007905 | 1/2008 |
| WO | WO2008115747 | 9/2008 |

OTHER PUBLICATIONS www.crystalgraphics.com/products Transitions—3D Sensations for Presentations , 5 pages, downloaded Mar. 11, 2009.

Bulterman, Dick C.A.; "Structured multimedia authoring;" ACM and TOMCCAP, vol. 1, Issue 1 (Feb. 2005), pp. 89-109.

Ngo, Chong-Wah et al.; "Detection of slide transition for topic indexing;" Aug. 2002 IEEE International Conference, vol. 2, pp. 533-536.

Ozawa, Noriaki et al.; "Slide identification for lecture movies by matching characters and images;" Proceedings of SPIE, vol. 5296, p. 74-81, 2004.

Power Point Tutorial 2000, pp. 1-2, Animation.

Gigonzac, G., et al.; "Electronic Slide Matching and Enhancement of a Lecture Video", Visual Media Production, 2007, IETCVMP, 4th European Conference; published Nov. 27-28, 2007.

Liu, Tiecheng, et al.; "Analysis and Enhancement of Videos of Electronic Slide Presentations", Multimedia and Expo, 2002, ICME '02 Proceedings, 2002 IEEE International Conference; published Aug. 26-29, 2002.

Fan, Quanfu, et al.; "Temporal Modeling of Slide Change in Presentation Videos", Acoustics, Speech and Signal Processing, 2007, ICASSP 2007, IEEE International Conference, published Apr. 15-20, 2007.

Kato, Yoshikazu, et al.; "Effect Lines for Specifying Animation Effects", Visual Languages and Human Centric Computing, 2004 IEEE Symposium, published Sep. 30, 2004.

Hunter, J. et al.; "Building and Indexing a Distributed Multimedia Presentation Archive Using SMIL", Research and Advanced Technology for Digital Libraries, 5th European Conference, ECDL 2001, Proceedings (Lecture Notes in Computer Science, vol. 2163), 415-28, 2001.

DeLucia, Andrea, et al.; "VLMigmtor: A Tool for Migrating Legacy Video Lectures to Multimedia Learning Objects", Software—Practice and Experience, vol. 38, No. 14, Nov. 25, 2008, pp. 1499-1530.

Hua, Xian-Sheng, et al.; "Content Based Photograph Slide Show with Incidental Music", Proceedings of the 2003 IEEE International Symposium on Circuits and Systems (Cat. No. 03CH37430), pp. II-648-651, vol. 2, 2003.

Niblack, Wayne; SlideFinder: A Tool for Browsing Presentation Graphics Using Content-Based Retrieval, Content-Based Access of Image and Video Libraries proceedings, IEEE Workshop, published Jun. 22, 1999.

Author unknown; Utilizing Metadata Contained in Digital Image Files, IBM IP.com Prior Art Database on Sep. 13, 2007 UTC.

Zongker, Douglas E., et al.; "On Creating Animated Presentations", Source Symposium on Computer Animation archive, Proceedings of the 2003 ACM SIGGRAPH, pp. 298-308.

(56) References Cited

OTHER PUBLICATIONS

Fujita, H., et al.; "Animation of Mapped Photo Collections for Storytelling", IEICE Transactions for Information and Systems, vol. E91-D, No. 6, pp. 1681-1692, published Jun. 2008.
Tatsuya, Ishihara et al.; "Analyzing visual layout for a non-visual presentation-document interface," 8th Intnt'l ACM SIGACCESSTATSUYA, Ishihara et al.; "Analyzing visual layout for a non-visual presentation-document interface," 8th Intnt'l ACM SIGACCESS conference, (2006), pp. 165-172.

\* cited by examiner

OBJECT-AWARE TRANSITIONS

CROSS-REFERENCE TO RELATED APPLICATIONS

This application is a continuation of U.S. patent application Ser. No. 12/206,217, entitled "Object-Aware Transitions," filed Sep. 8, 2008, which is herein incorporated by reference in its entirety for all purposes.

BACKGROUND

1. Technical Field

The present invention relates generally to transitioning between sequential screens.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

One use which has been found for computers has been to facilitate the communication of information to an audience. For example, it is not uncommon for various types of public speaking, (such as lectures, seminars, classroom discussions, keynote addresses, and so forth), to be accompanied by computer generated presentations that emphasize or illustrate points being made by the speaker. For example, such presentations may include music, sound effects, images, videos, text passages, numeric examples or spreadsheets, or audiovisual content that emphasizes points being made by the speaker.

Typically, these presentations are composed of "slides" that are sequentially presented in a specified order. Typically, to transition between slides, a first slide would be replaced by a second slide on the screen. In some circumstances, some form of animation might be performed on the slides as they move on and off. However, the slides themselves are generally static images. Due to the prevalence of such computer-generated and facilitated presentations, one challenge is to maintain the interest level generated by such presentations, i.e., to keep the audience interested in the material being presented on the screen.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for providing object-aware transitions between slides of a presentation. Such object-aware transitions may include identifying each object on the slides being transitioned in and out. The objects or object-types may then be individually manipulated as part of the transition, such as by application of various effects, That is, the transition process may account for and independently animate or otherwise transition each of the objects or object-types composing the different slides.

In some instances, such object awareness can be leveraged as part of the transition. For example, in one embodiment, the same object, such as a graphic, word, number, or characters in a word or number, may be present in the outgoing and incoming slides. In one such example, the transition may take advantage of the presence of the common objects in the outgoing and incoming slides to provide an effect or animations specifically for those objects present in both slides. In this way, the presence of the object in both slides may be used to tailor the slide transition.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The application is generally directed to providing object-aware transitions between slides of a presentation. In particular, in accordance with the present disclosure, different objects within each slide are identified and can be separately and independently handled during slide transitions. In certain embodiments, this involves identifying objects present in both and outgoing and incoming slide and providing specific animation or handling for those objects. With this in mind, an example of a suitable device for use in accordance with the present disclosure is as follows.

Figure 1:
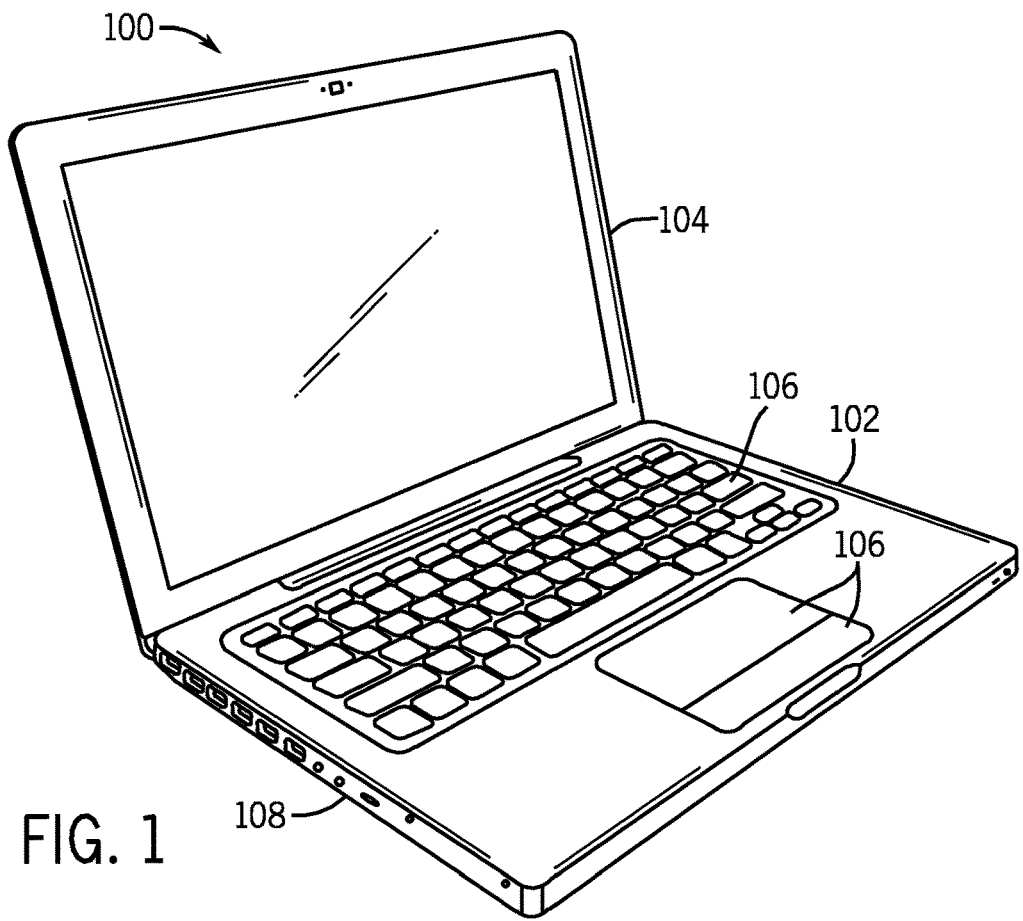
FIG. 1 is a perspective view illustrating an electronic device in accordance with one embodiment of the present invention.

An exemplary electronic device 100 is illustrated in FIG. 1 in accordance with one embodiment of the present invention. In some embodiments, including the presently illustrated embodiment, the device 100 may be processor-based system, such as a laptop or desktop computer, suitable for preparing and/or displaying presentations, such as using the Keynote® software package available from Apple Inc as part of the iWork® productivity package. Other processor-based systems suitable for preparing and/or displaying presentations may include servers, thin-client workstations, portable or handheld devices capable of running presentation software, or the like. By way of example, the electronic device 100 may be a model of a MacBook, MacBook Pro, MacBook Air, iMac, Mac mini, or Mac Pro available from Apple Inc.

In the presently illustrated embodiment, the exemplary electronic device 100 includes an enclosure or housing 102, a display 104, input structures 106, and input/output connectors 108. The enclosure 102 may be formed from plastic, metal, composite materials, or other suitable materials, or any combination thereof. The enclosure 102 may protect the interior components of the electronic device 100 from physical damage, and may also shield the interior components from electromagnetic interference (EMI).

The display 104 may be a liquid crystal display (LCD), cathode ray tube (CRT) or other suitable display type. For example, in one embodiment, a suitable LCD display may be based on light emitting diodes (LED) or organic light emitting diodes (OLED). In one embodiment, one or more of the input structures 106 are configured to control the device 100 or applications running on the device 100. Embodiments of the portable electronic device 100 may include any number of input structures 106, including buttons, switches, a mouse, a control or touch pad, a keyboard, or any other suitable input structures. The input structures 106 may operate to control functions of the electronic device 100 and/or any interfaces or devices connected to or used by the electronic device 100. For example, the input structures 106 may allow a user to navigate a displayed user interface or application interface.

The exemplary device 100 may also include various input and output ports 108 to allow connection of additional devices. For example, the device 100 may include any number of input and/or output ports 108, such as headphone and headset jacks, video ports, universal serial bus (USB) ports, IEEE-1394 ports, Ethernet and modem ports, and AC and/or DC power connectors. Further, the electronic device 100 may use the input and output ports 108 to connect to and send or receive data with any other device, such as a modem, external display, projector, networked computers, printers, or the like. For example, in one embodiment, the electronic device 100 may connect to a scanner, digital camera or other device capable of generating digital images (such as an iPhone or other camera-equipped cellular telephone) via a USB connection to send and receive data files, such as image files.

Figure 2:
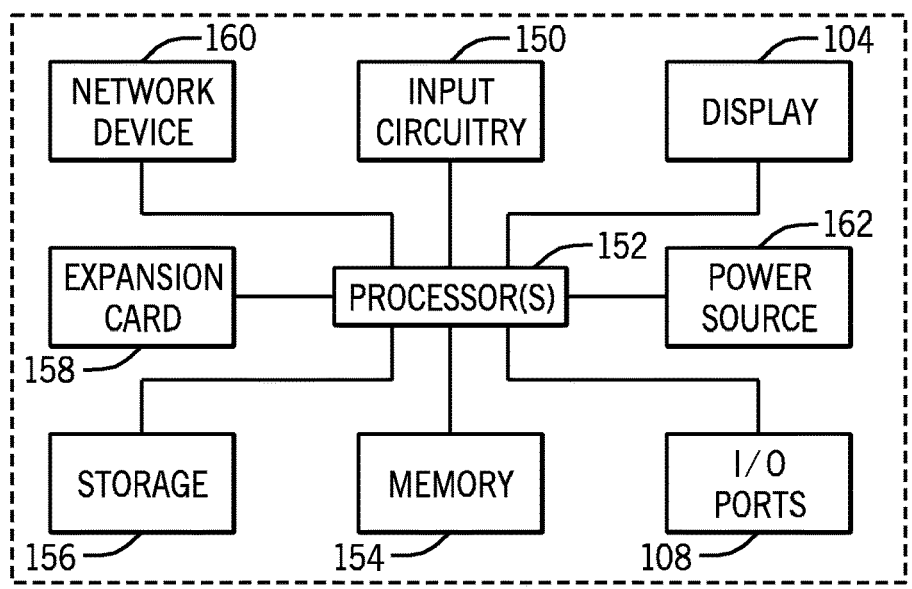
FIG. 2 is a simplified block diagram illustrating components of an electronic device in accordance with one embodiment of the present invention.

The electronic device 100 includes various internal components which contribute to the function of the device 100. FIG. 2 is a block diagram illustrating the components that may be present in the electronic device 100 and which may allow the device 100 to function in accordance with the techniques discussed herein. Those of ordinary skill in the art will appreciate that the various functional blocks shown in FIG. 2 may comprise hardware elements (including circuitry), software elements (including computer code stored on a machine-readable medium) or a combination of both hardware and software elements. It should further be noted that FIG. 2 is merely one example of a particular implementation and is merely intended to illustrate the types of components that may be present in a device 100 that allow the device 100 to function in accordance with the present techniques.

In the presently illustrated embodiment, the components may include the display 104 and the I/O ports 108 discussed above. In addition, as discussed in greater detail below, the components may include input circuitry 150, one or more processors 152, a memory device 154, a non-volatile storage 156, expansion card(s) 158, a networking device 160, and a power source 162.

The input circuitry 150 may include circuitry and/or electrical pathways by which user interactions with one or more input structures 106 are conveyed to the processor(s) 152. For example, user interaction with the input structures 106, such as to interact with a user or application interface displayed on the display 104, may generate electrical signals indicative of the user input. These input signals may be routed via the input circuitry 150, such as an input hub or bus, to the processor(s) 152 for further processing.

The processor(s) 152 may provide the processing capability to execute the operating system, programs, user and application interfaces, and any other functions of the electronic device 100. The processor(s) 152 may include one or more microprocessors, such as one or more "general-purpose" microprocessors, one or more special-purpose microprocessors and/or ASICS, or some combination thereof. For example, the processor 152 may include one or more instruction processors, as well as graphics processors, video processors, and/or related chip sets.

As noted above, the components may also include a memory 154. The memory 154 may include a volatile memory, such as random access memory (RAM), and/or a non-volatile memory, such as read-only memory (ROM). The memory 154 may store a variety of information and may be used for various purposes. For example, the memory 154 may store firmware for the electronic device 100 (such as a basic input/output instruction or operating system instructions), other programs that enable various functions of the electronic device 100, user interface functions, processor functions, and may be used for buffering or caching during operation of the electronic device 100.

The components may further include the non-volatile storage 156. The non-volatile storage 156 may include ROM, flash memory, a hard drive, or any other suitable optical, magnetic, or solid-state storage medium, or a combination thereof. The non-volatile storage 156 may be used to store data files such as media content (e.g., music, image, video, and/or presentation files), software (e.g., a presentation application for implementing the presently disclosed techniques on electronic device 100), wireless connection information (e.g., information that may enable the electronic device 100 to establish a wireless connection, such as a telephone or wireless network connection), and any other suitable data.

The embodiment illustrated in FIG. 2 may also include one or more card slots. The card slots may be configured to receive an expansion card 158 that may be used to add functionality to the electronic device 100, such as additional memory, I/O functionality, or networking capability. Such an expansion card 158 may connect to the device through any type of suitable connector, and may be accessed internally or external to the enclosure 102. For example, in one embodiment, the expansion card 158 may be flash memory card, such as a SecureDigital (SD) card, mini- or microSD, CompactFlash card, Multimedia card (MMC), or the like.

The components depicted in FIG. 2 also include a network device 160, such as a network controller or a network interface card (NIC). In one embodiment, the network device 160 may be a wireless NIC providing wireless connectivity over any 802.11 standard or any other suitable wireless networking standard. The network device 160 may allow the electronic device 100 to communicate over a network, such as a Local Area Network (LAN), Wide Area Network (WAN), or the Internet. Further, the electronic device 100 may connect to and send or receive data with any device on the network, such as portable electronic devices, personal computers, printers, and so forth. Alternatively, in some embodiments, the electronic device 100 may not include a network device 160. In such an embodiment, a NIC may be added into card slot 158 to provide similar networking capability as described above.

Further, the components may also include a power source 162. In one embodiment, the power source 162 may be one or more batteries, such as a lithium-ion polymer battery. The battery may be user-removable or may be secured within the housing 102, and may be rechargeable. Additionally, the power source 162 may include AC power, such as provided by an electrical outlet, and the electronic device 100 may be connected to the power source 162 via a power adapter. This power adapter may also be used to recharge one or more batteries if present.

Figure 3:
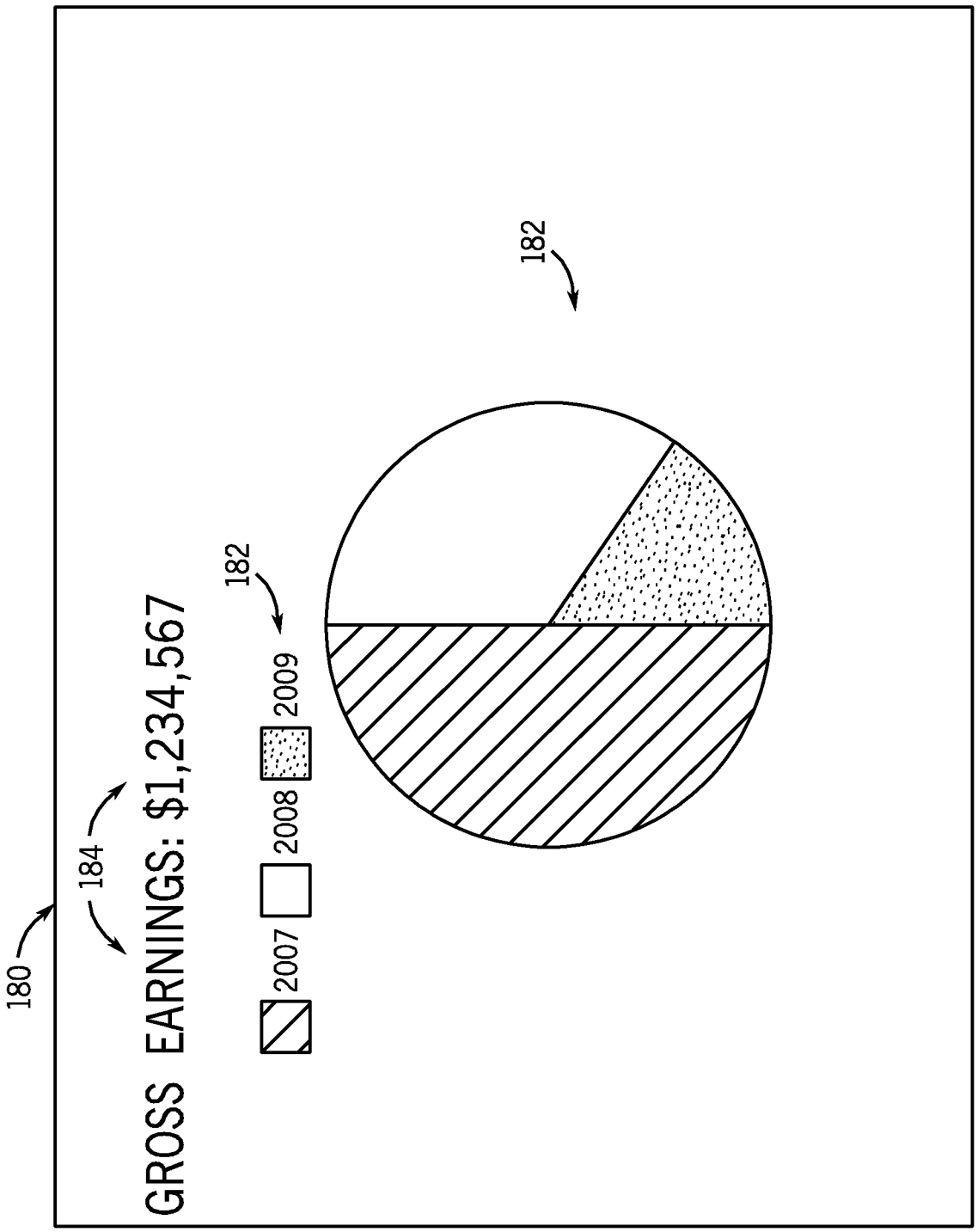
FIG. 3 depicts a slide including objects in accordance with one embodiment of the present invention.

With the foregoing discussion in mind, various techniques and algorithms for implementing aspects of the present disclosure on such devices 100 and accompanying hardware and memory devices are discussed below. Turning to FIG. 3, a slide 180 having graphic objects 182 and character objects 184 (i.e., text and/or numbers or strings of text and/or numbers) is depicted. Such a slide is typically one part of a presentation that typically includes many slides that are sequentially displayed. For example, such a presentation (and the individual slides of the presentation) may be composed in an application (such as Keynote® available from Apple Inc.) suitable for generating and displaying presentations on processor-based system such as a computer.

The presentation application may provide multiple modes of operation, such as an edit mode and a presentation mode. In such an embodiment, when in the edit mode, the presentation application may provide a convenient and user-friendly interface for a user to add, edit, remove, or otherwise modify the slides of a slide show, such as by adding text, numeric, graphic, or video objects to a slide. To display a created slide or a sequence of slides in a format suitable for audience viewing, a presentation mode of the presentation application may be employed. In some embodiments, the presentation application may provide a full-screen presentation of the slides in the presentation mode, including any animations, transitions, or other properties defined for each object within the slides.

As used herein, the term "object" refers to any individually editable component on a slide of a presentation. That is, something that can be added to a slide and/or be altered or edited on the slide, such as to change its location or size or to change its content, may be described as an object. For example, a graphic, such as an image, photo, line drawing, clip-art, chart, table, which may be provided on a slide may constitute an object. Likewise, a character or string of characters may constitute an object. Likewise, an embedded video clip may also constitute an object that is a component of a slide. Therefore, in certain embodiments, characters and/or character strings (alphabetic, numeric, and/or symbolic), image files (.jpg, .bmp, .gif, .tif, .png, .cgm, .svg, .pdf, .wmf, and so forth), video files (.avi, .mov, .mp4, .mpg, .qt, .rm, .swf, .wmv, and so forth) and other multimedia files or other files in general may constitute "objects" as used herein.

Figure 4:
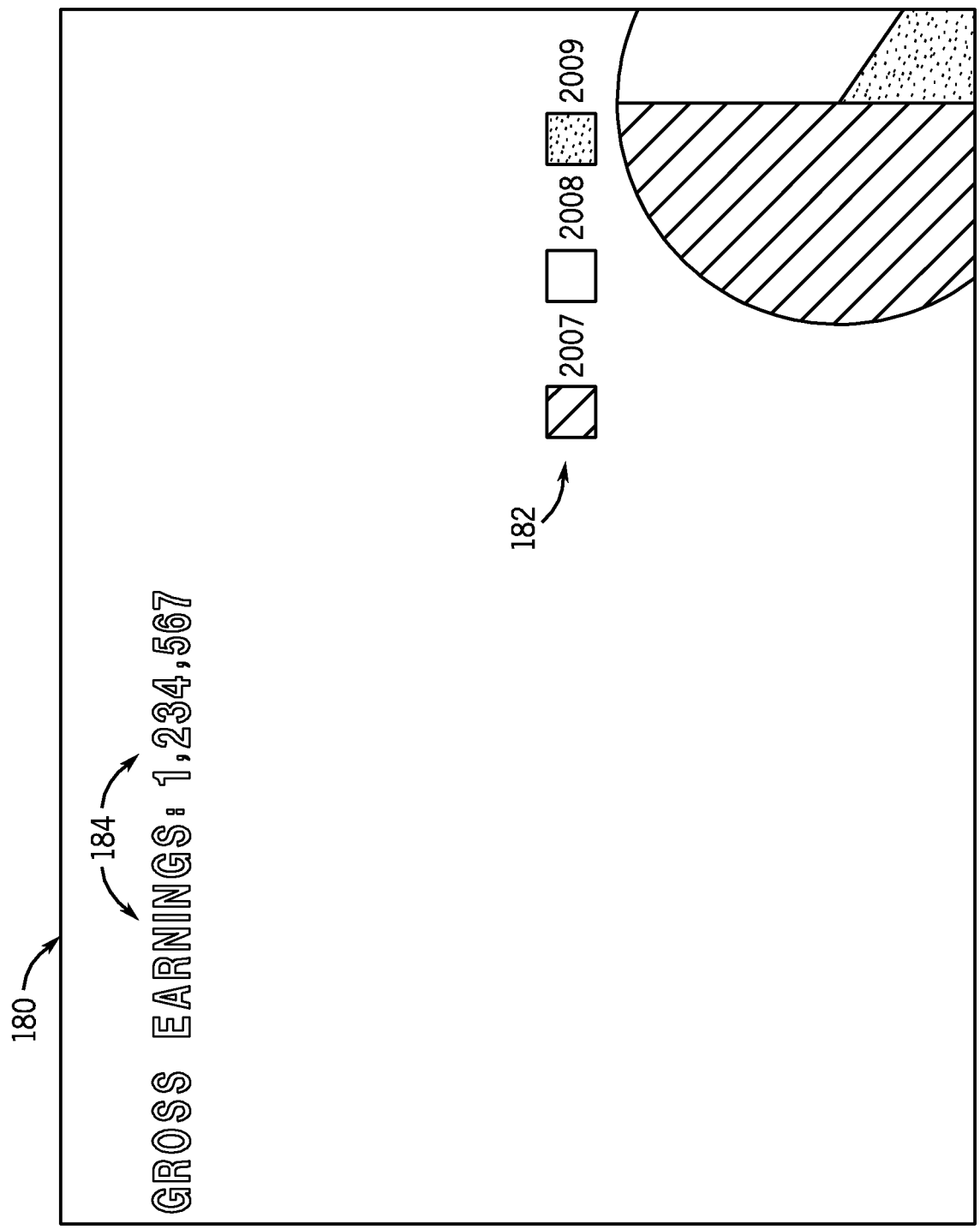
FIG. 4 depicts the slide of FIG. 3 undergoing a transition in accordance with one embodiment of the present invention.
Figure 5A:
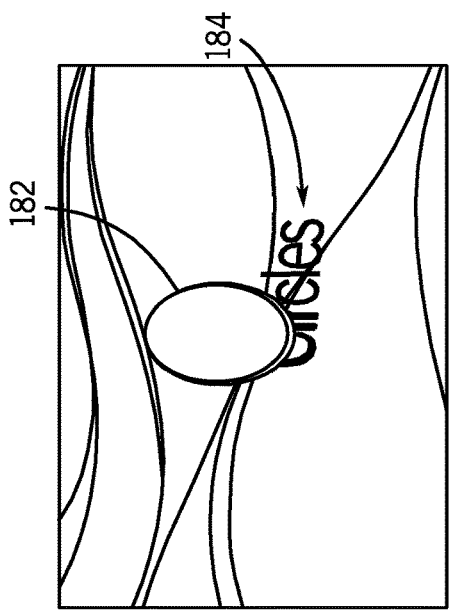
FIG. 5A depicts a screenshot of an object-aware slide transition in accordance with one embodiment of the present invention.
Figure 5C:
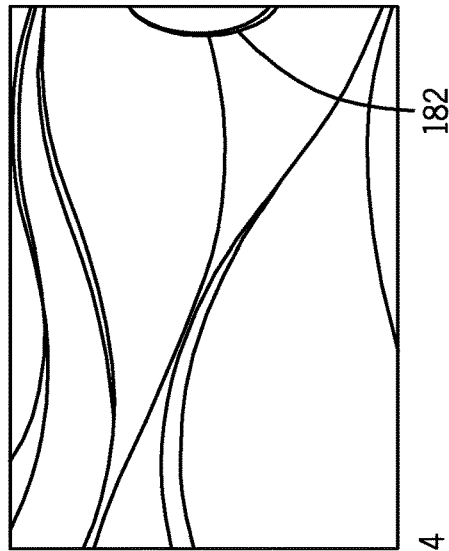
FIG. 5C depicts a screenshot of an object-aware slide transition in accordance with one embodiment of the present invention.
Figure 5B:
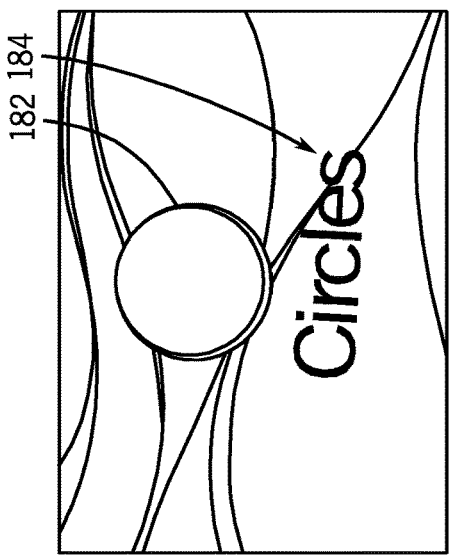
FIG. 5B depicts a screenshot of an object-aware slide transition in accordance with one embodiment of the present invention.
Figure 5E:
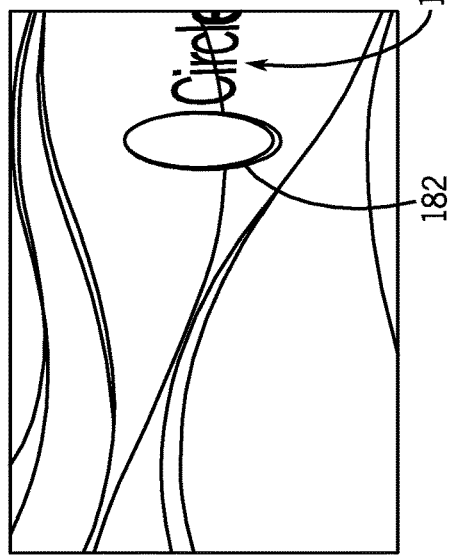
FIG. 5E depicts a screenshot of an object-aware slide transition in accordance with one embodiment of the present invention.
Figure 5D:
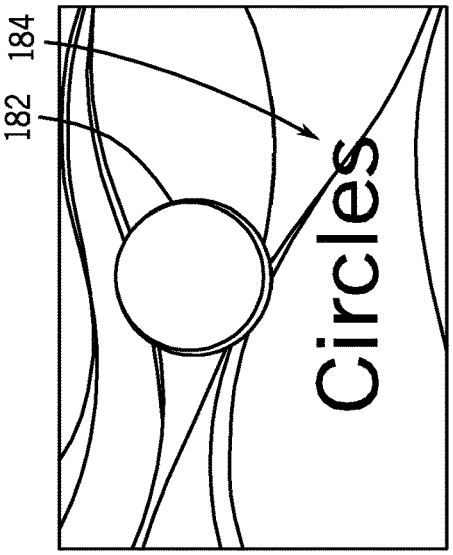
FIG. 5D depicts a screenshot of an object-aware slide transition in accordance with one embodiment of the present invention.
Figure 5F:
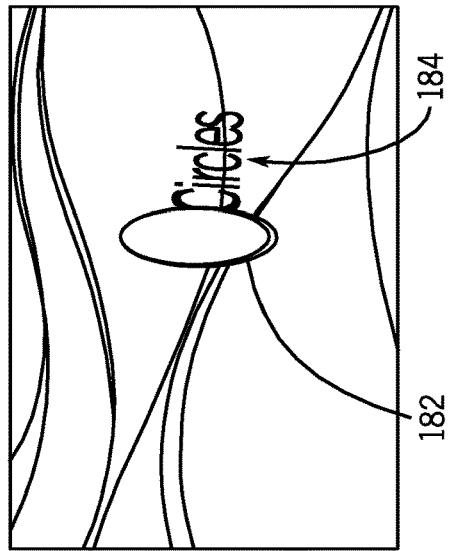
FIG. 5F depicts a screenshot of an object-aware slide transition in accordance with one embodiment of the present invention.
Figure 6A:
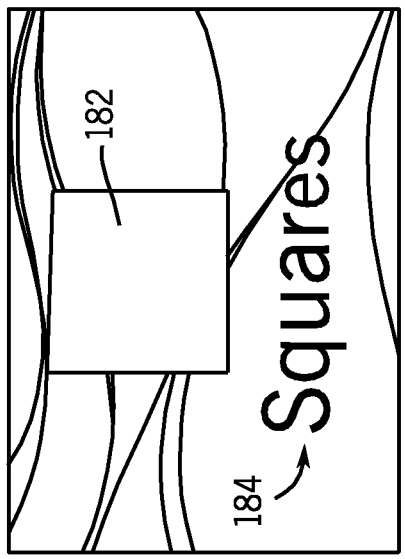
FIG. 6A depicts a screenshot of another object-aware slide transition in accordance with one embodiment of the present invention.
Figure 6B:
FIG. 6B depicts a screenshot of another object-aware slide transition in accordance with one embodiment of the present invention.
Figure 6C:
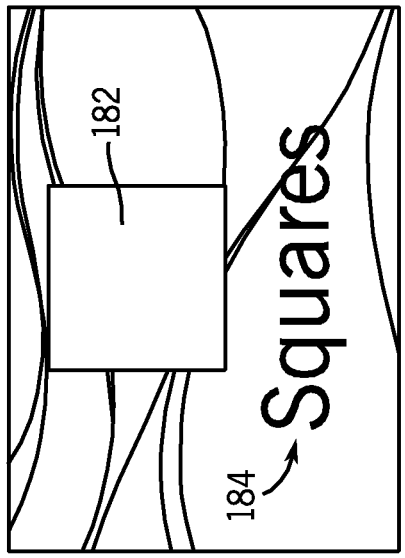
FIG. 6C depicts a screenshot of another object-aware slide transition in accordance with one embodiment of the present invention.
Figure 6D:
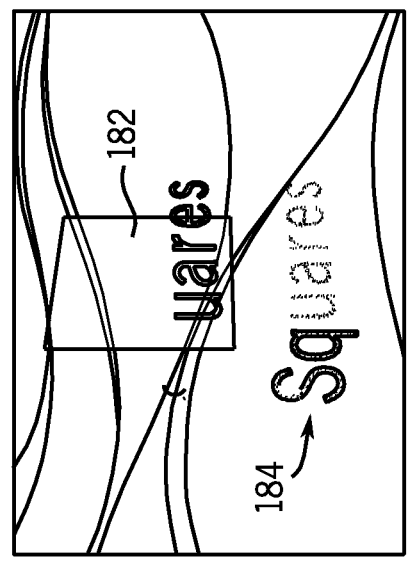
FIG. 6D depicts a screenshot of another object-aware slide transition in accordance with one embodiment of the present invention.
Figure 7A:
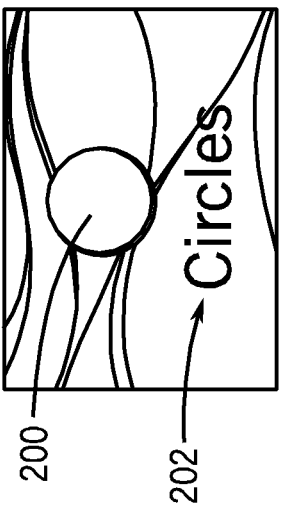
FIG. 7A depicts a screenshot of a further object-aware slide transition in accordance with one embodiment of the present invention.
Figure 7D:
FIG. 7D depicts a screenshot of a further object-aware slide transition in accordance with one embodiment of the present invention.
Figure 7G:
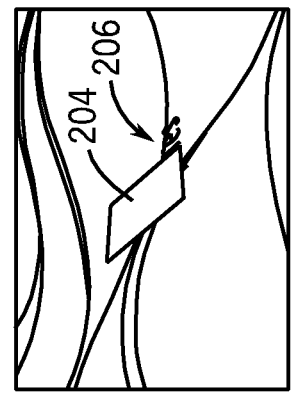
FIG. 7G depicts a screenshot of a further object-aware slide transition in accordance with one embodiment of the present invention.
Figure 7B:
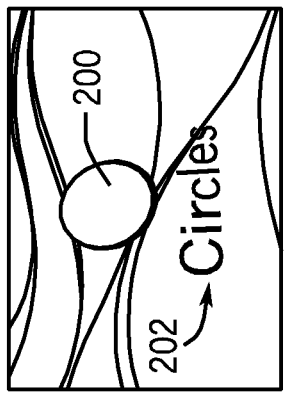
FIG. 7B depicts a screenshot of a further object-aware slide transition in accordance with one embodiment of the present invention.
Figure 7E:
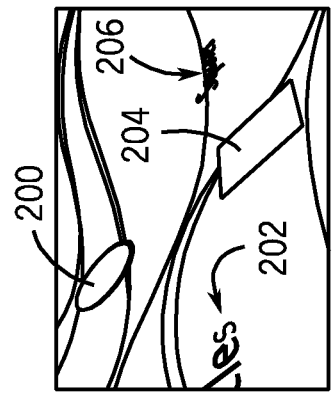
FIG. 7E depicts a screenshot of a further object-aware slide transition in accordance with one embodiment of the present invention.
Figure 7H:
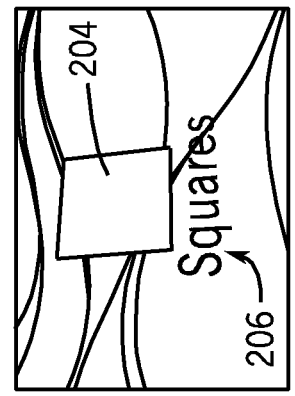
FIG. 7H depicts a screenshot of a further object-aware slide transition in accordance with one embodiment of the present invention.
Figure 7C:
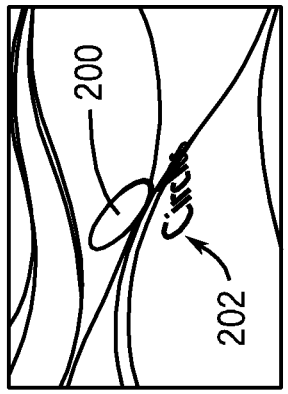
FIG. 7C depicts a screenshot of a further object-aware slide transition in accordance with one embodiment of the present invention.
Figure 7F:
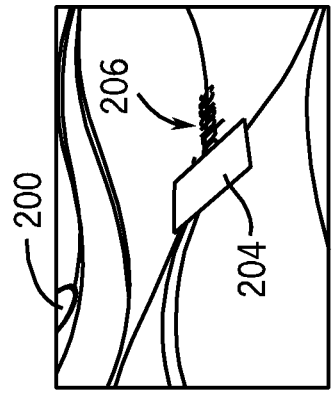
FIG. 7F depicts a screenshot of a further object-aware slide transition in accordance with one embodiment of the present invention.
Figure 7I:
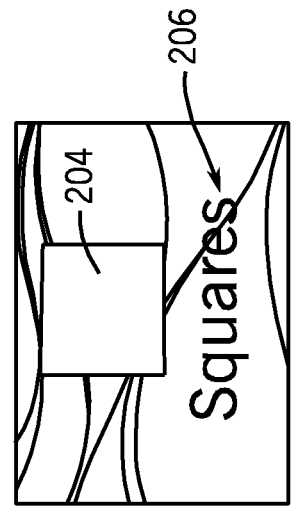
FIG. 7I depicts a screenshot of a further object-aware slide transition in accordance with one embodiment of the present invention.
Figure 8C:
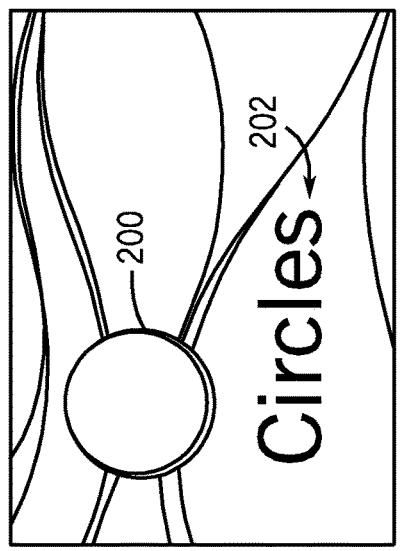
FIG. 8C depicts a screenshot of an additional object-aware slide transition in accordance with one embodiment of the present invention.
Figure 8F:
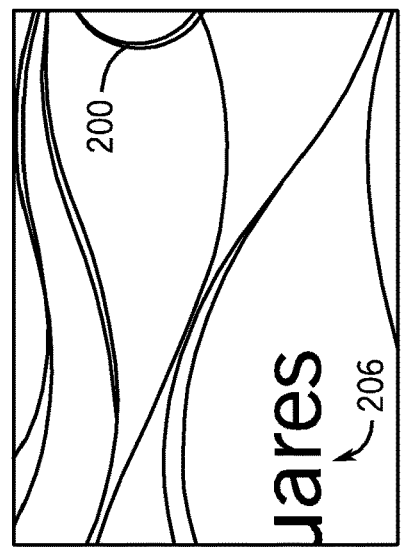
FIG. 8F depicts a screenshot of an additional object-aware slide transition in accordance with one embodiment of the present invention.
Figure 8B:
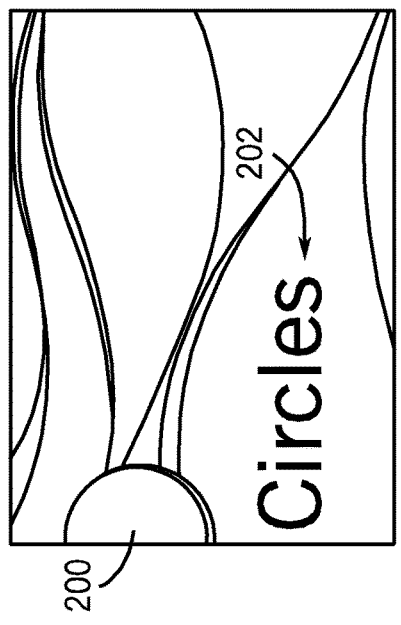
FIG. 8B depicts a screenshot of an additional object-aware slide transition in accordance with one embodiment of the present invention.
Figure 8E:
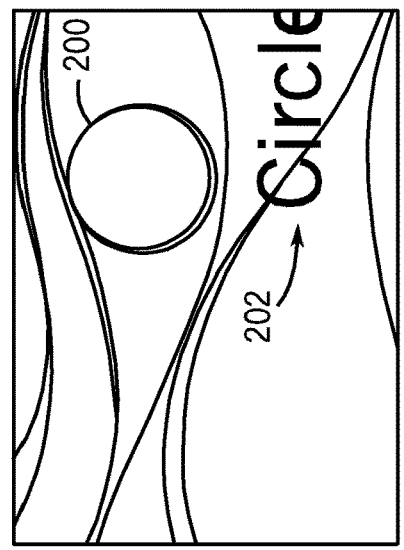
FIG. 8E depicts a screenshot of an additional object-aware slide transition in accordance with one embodiment of the present invention.
Figure 8A:
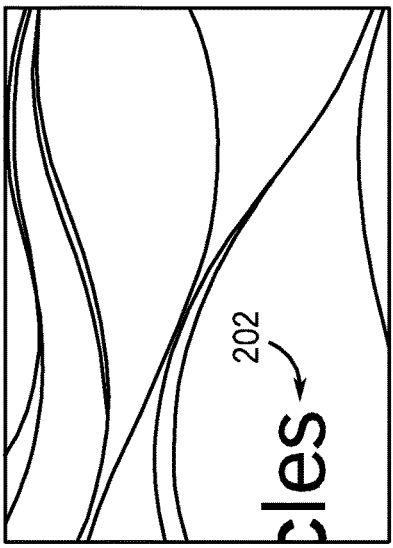
FIG. 8A depicts a screenshot of an additional object-aware slide transition in accordance with one embodiment of the present invention.
Figure 8D:
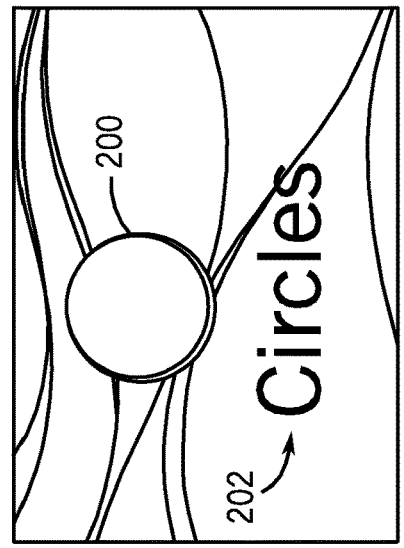
FIG. 8D depicts a screenshot of an additional object-aware slide transition in accordance with one embodiment of the present invention.
Figure 9A:
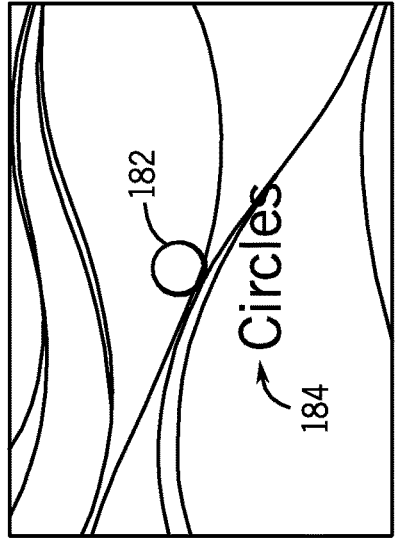
FIG. 9A depicts a screenshot of another object-aware slide transition in accordance with one embodiment of the present invention.
Figure 9B:
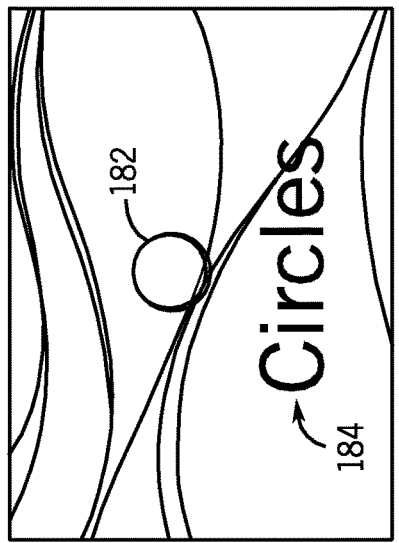
FIG. 9B depicts a screenshot of another object-aware slide transition in accordance with one embodiment of the present invention.
Figure 9C:
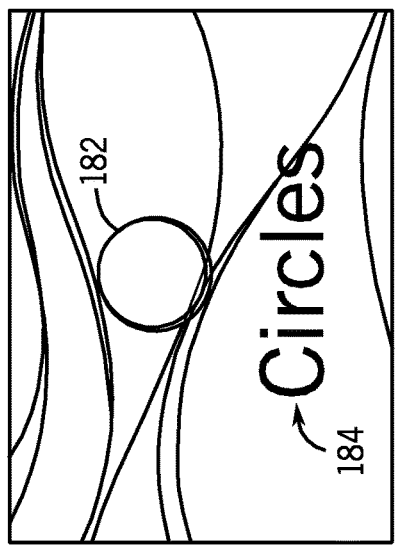
FIG. 9C depicts a screenshot of another object-aware slide transition in accordance with one embodiment of the present invention.
Figure 9D:
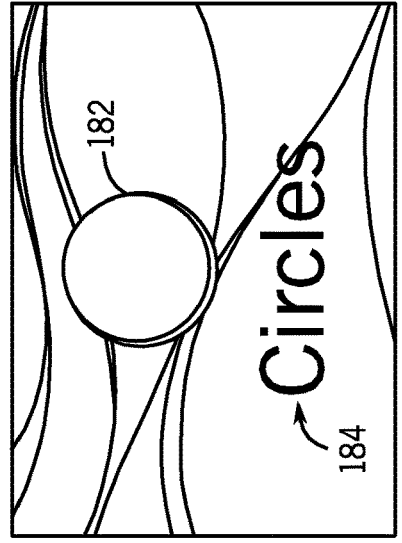
FIG. 9D depicts a screenshot of another object-aware slide transition in accordance with one embodiment of the present invention.
Figure 9E:
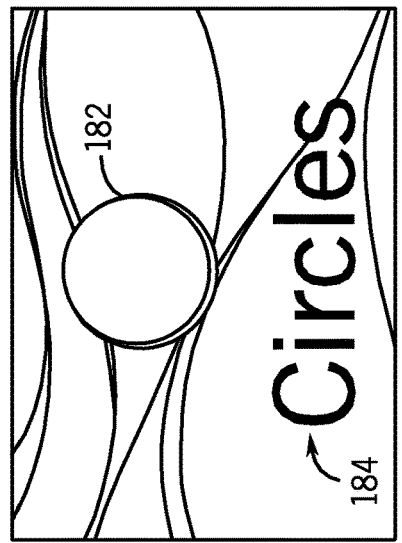
FIG. 9E depicts a screenshot of another object-aware slide transition in accordance with one embodiment of the present invention.
Figure 9F:
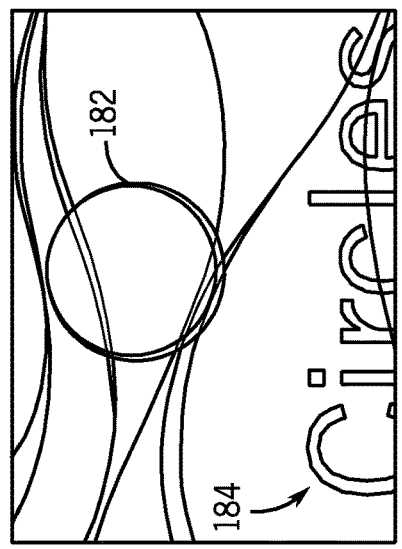
FIG. 9F depicts a screenshot of another object-aware slide transition in accordance with one embodiment of the present invention.
Figure 10A:
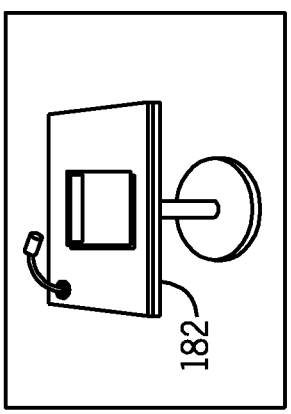
FIG. 10A depicts a screenshot of an object-aware slide transition with persistent objects in accordance with one embodiment of the present invention.
Figure 10B:
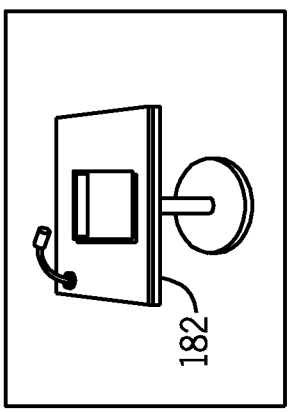
FIG. 10B depicts a screenshot of an object-aware slide transition with persistent objects in accordance with one embodiment of the present invention.
Figure 10C:
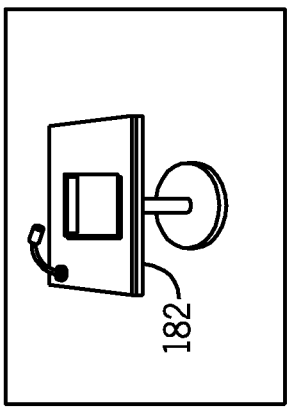
FIG. 10C depicts a screenshot of an object-aware slide transition with persistent objects in accordance with one embodiment of the present invention.
Figure 10D:
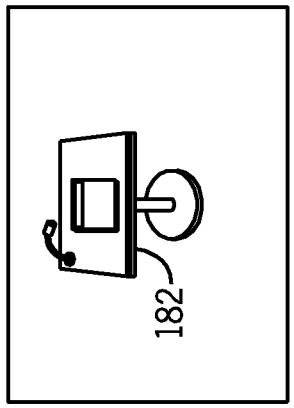
FIG. 10D depicts a screenshot of an object-aware slide transition with persistent objects in accordance with one embodiment of the present invention.
Figure 10E:
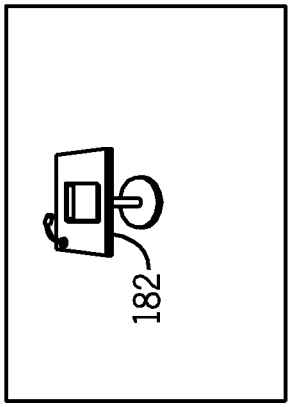
FIG. 10E depicts a screenshot of an object-aware slide transition with persistent objects in accordance with one embodiment of the present invention.
Figure 10F:
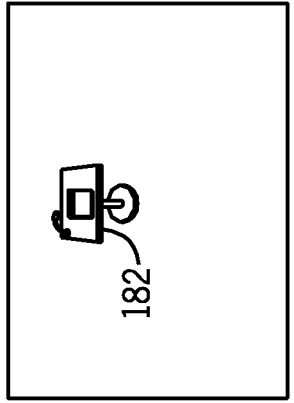
FIG. 10F depicts a screenshot of an object-aware slide transition with persistent objects in accordance with one embodiment of the present invention.
Figure 10G:
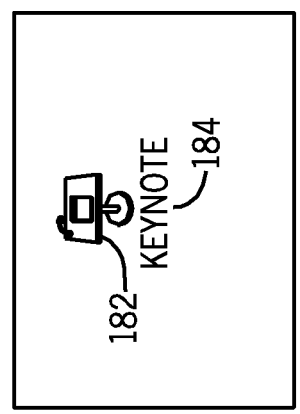
FIG. 10G depicts a screenshot of an object-aware slide transition with persistent objects in accordance with one embodiment of the present invention.
Figure 10H:
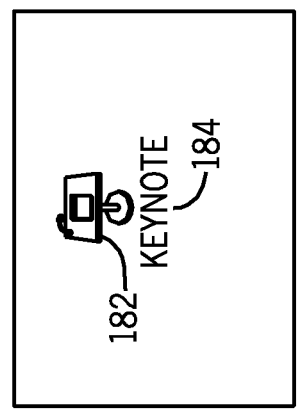
FIG. 10H depicts a screenshot of an object-aware slide transition with persistent objects in accordance with one embodiment of the present invention.
Figure 10I:
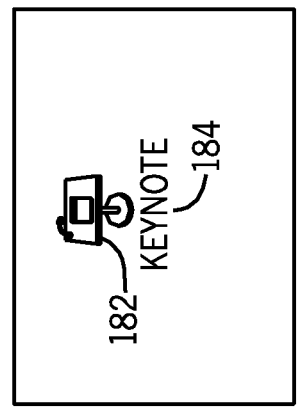
FIG. 10I depicts a screenshot of an object-aware slide transition with persistent objects in accordance with one embodiment of the present invention.
Figure 11A:
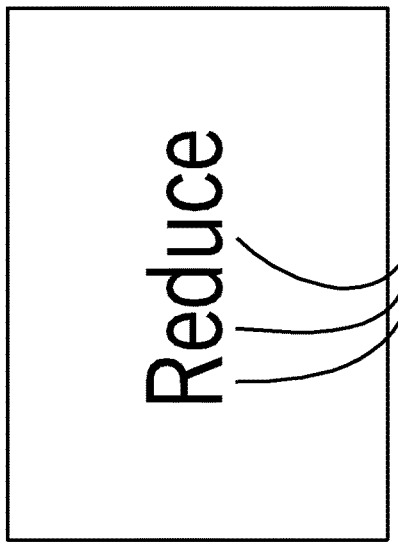
FIG. 11A depicts a screenshot of another object-aware slide transition with persistent objects in accordance with one embodiment of the present invention.
Figure 11B:
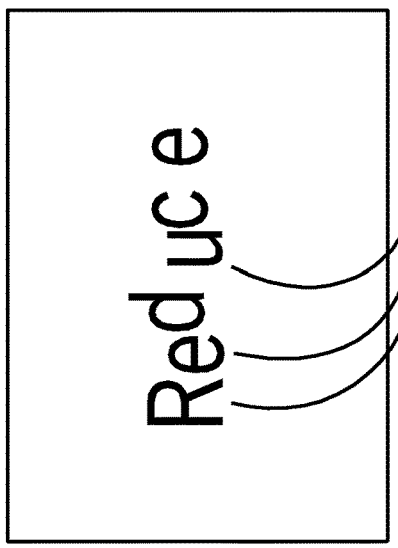
FIG. 11B depicts a screenshot of another object-aware slide transition with persistent objects in accordance with one embodiment of the present invention.
Figure 11C:
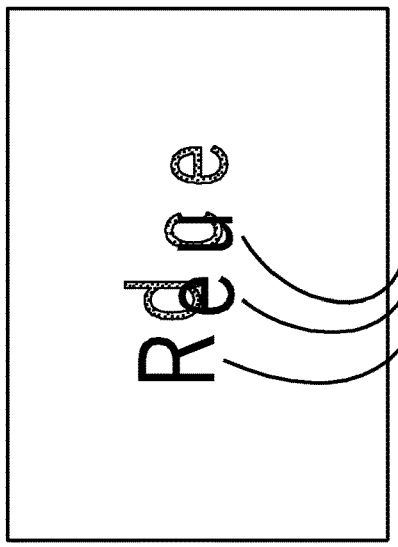
FIG. 11C depicts a screenshot of another object-aware slide transition with persistent objects in accordance with one embodiment of the present invention.
Figure 11D:
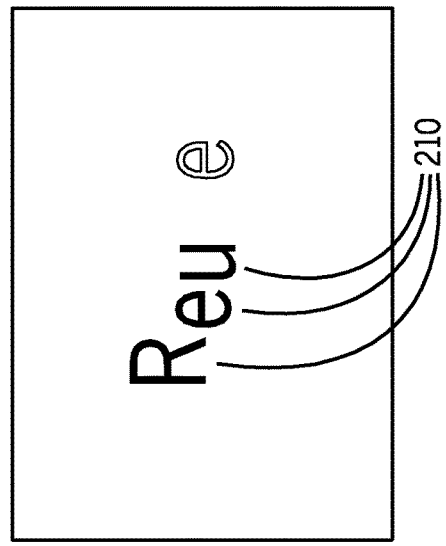
FIG. 11D depicts a screenshot of another object-aware slide transition with persistent objects in accordance with one embodiment of the present invention.
Figure 11E:
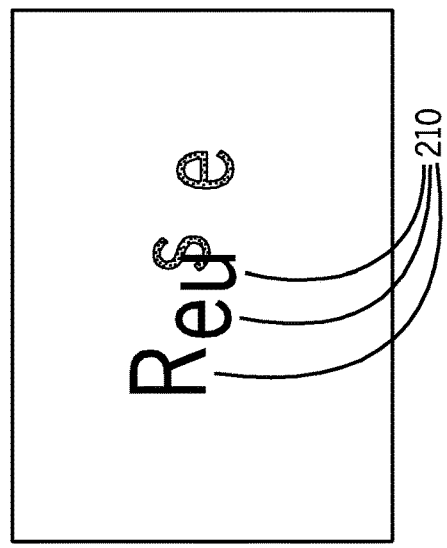
FIG. 11E depicts a screenshot of another object-aware slide transition with persistent objects in accordance with one embodiment of the present invention.
Figure 11F:
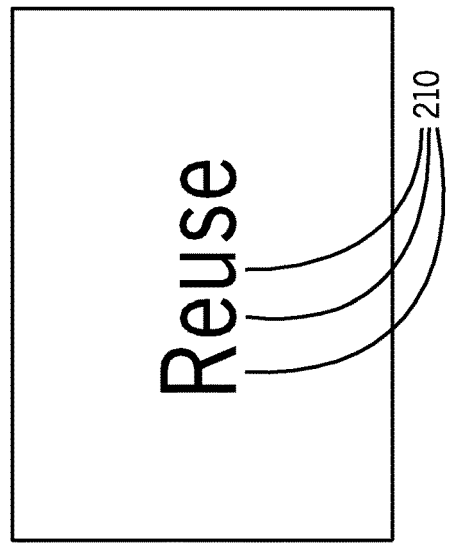
FIG. 11F depicts a screenshot of another object-aware slide transition with persistent objects in accordance with one embodiment of the present invention.

In one embodiment, the objects provided on the slides of a presentation are identified, automatically or by a user, allowing each object to be independently manipulated, such an animated, when transitioning between slides. That is, for a slide being transitioned out, each object may be separately handled, so that different objects or types of objects may undergo a different effect as part of the transition. For example, turning to FIG. 4, text and numeric objects 184 on the slide may fade out as graphic objects 182 are animated off the edges of the slide. Likewise, objects or object types on the incoming slide may also be independently handled, such as by fading in text on the incoming slide and animating the entrance of images of the incoming slide from above or from the sides.

By identifying each object on a slide, effects for transitioning an object on or off the screen may be specified (automatically or by a user) for each object or each type of object (such as graphics files, text boxes, videos, etc.) independently of one another. The effect used in transitioning an object may depend on some characteristic of the object, such as a file type, location on the slide, color, shape, size, and so forth. For example, how close an object is to an edge may be a factor in determining whether the object will be animated on to or off of a slide and, if such an animation is selected, which edge the animation will occur relative to, how fast the animation will occur, and so forth. While the transition effects for different objects or object types may be handled automatically in one embodiment (such as based upon the factors described above), in other embodiments, a user may specify what effects are associated with the transition of an object on or off the screen. For example, a user may use a presentation application interface screen to specify properties of one or more objects on a slide, including transition effects for moving the object on or off the screen.

Such object, or content, aware transitions differ from traditional approaches to transition between slides in which each slide is represented by a static image (and, therefore, treated as a single unit) and transitions would generally be an animation between the static images. However, individual objects on the slides were not individually manipulated, such as animated, during transitions. Thus, object-aware transitions, in the present context, are transitions that have access to the different individual objects of which the slides or slides are composed, and where each object can be animated or otherwise manipulated independent of the others.

In terms of the various effects that each object can be subjected to in such object-aware transitions, virtually any animation and/or manipulation that can be performed on the respective type of object may be suitable. By way of example, turning now to FIGS. 5A-5F, a sequence of screenshots depicting an example of an animated slide transition is depicted. In this example, the animation may be characterized as a "rotate and slide" animation in which a graphic object 182, here a circle, is "rotated" while "sliding" off of the right side of the slide from the center. Independent of the graphic object 182, a character object 184, here the text string "Circles", is also rotated and slid off the right of the slide. The character object 184, while rotating and sliding to the right of the slide, is also slid upward from beneath the circle to the vertical center of the slide while being animated off of the slide. Thus, the character object 184 and the graphic object 182 are animated independently of one another such that one object undergoes a different animation, i.e., vertical sliding, in the transition. It is also worth noting that the selected transition, such as "rotate and slide", may be used to animate in the objects of the next sequential slide. For example, in an incoming slide, a graphic object and character object may be rotated and slid in from the vertical center of the left side of the next slide, with one or both objects also undergoing an upward or downward animation to achieve the desired presentation location on the slide.

In practice, the identification of the graphic and character objects in the slide may be accomplished automatically, such as by an algorithm of a presentation application that identifies such objects by file type extensions or other indicators, or by user designation that the slide component is an object for purposes of object-aware transitions. Once the objects are identified and a transition effect, such as "rotate and slide", is selected for the slide by the user, the manner in which the selected effect is applied to each object in the slide may be determined automatically. For example, it may be automatically determined that all objects will rotate and slide the off of the slide from the vertical center of the slide, and the animation of each object may be determined accordingly. Alternatively, in other embodiments, the user may be able to specify particular effects or animations for each object of the slide, or to specify the manner in which an effect is accomplished, such as with or without vertical centering for an individual object.

In another example, turning now to FIGS. 6A-6D, a sequence of screenshots depicting another animated slide transition is provided. In this example, the animation may be characterized as a "dissolve and flip" animation in which a graphic object 182, here a square, and a character object 184, here the text string "Squares", are rotated in place, i.e., flipped, while dissolving or fading from view, such as by progressively increasing the transparency of the objects. As in the previous example, the character object 184 and the graphic object 182 are animated independently of one another. As noted above, the "dissolve and flip" transition may also be used to animate the objects of the next sequential slide to introduce those objects, though obviously in such an implementation, the objects will not be dissolving but appearing or materializing.

In yet another example, a sequence of screenshots depicting another animated slide transition is depicted in FIGS. 7A-7I. In this example, the animation may be characterized as an "isometric" animation in which, as depicted in FIGS. 7A-7F, a first graphic object 200, here a circle, and a first character object 202, here the text string "Circles", are subjected to an isometric transformation and moved off the top and left edges, respectively, of a slide. As in the previous example, the first character object 202 and the first graphic object 200 are animated independently of one another, of other objects in the slide, and/or of other objects in the next slide. In addition, the sequence of screenshots depicts, in FIGS. 7D-7I, the animation onto the screen of a second graphic object 204, here a square, and a second character object 206, here the text string "Squares". In the incoming transition of the second graphic object 204 and the second character object 206, these objects under go the reverse isometric transformation and slide in from opposite respective sides of the screen as their first slide counterparts. As noted above, the "isometric" transition for the incoming slide may also be applied to each object of the incoming slide in an independent manner and/or without regard for the objects of the previous slide.

In a further example, a sequence of screenshots depicting another animated slide transition is depicted in FIGS. 8A-8F. In this example, the animation may be characterized as an "object push" animation in which, as depicted in FIGS. 8A-8D, a first graphic object 200, here a circle, and a first character object 202, here the text string "Circles", are "pushed" in from the left side of the slide. In the depicted example, the first graphic object 200 and the first character object 202 are pushed in at different speeds, e.g., the first graphic object 200 is lagging, though, at the end of the push in animation, the first graphic object 200 is aligned over the center of the first character object 202. Thus, the first character object 202 and the first graphic object 200 move independently of one another, of other objects in the slide, and/or of other objects in the next slide. In addition, the sequence of screenshots depicts, in FIGS. 8E-8F, the first graphic object 200 and the first character object 202 being pushed off the right side of the slide at different speeds, i.e., the graphic is lagging relative to the text, and a second character object 206 associated with the next slide is being pushed onto the slide from the left side. As with the previous slide, the "object push" transition for the incoming slide may also be applied to each object of the incoming slide in an independent manner (such as each object moving at a different speed or entering from a different direction) and/or without regard for the objects of the previous slide.

In another example, a sequence of screenshots depicting another animated slide transition is depicted in FIGS. 9A-9F. In this example, the animation may be characterized as an "object zoom" animation in which, as depicted in FIGS. 9A-9D, a graphic object 182, here a circle, and a character object 184, here the text string "Circles", arise out of the slide. In the depicted example, the graphic object 182 and the character object 184 rise up or appear at different times, i.e., the character object 184 is discernible first. Thus, the character object 184 and the graphic object 182 are animated independently of one another, of other objects in the slide, and/or of other objects in the next slide. In addition, the sequence of screenshots depicts, in FIGS. 9E-9F, the exiting transition of the graphic object 182 and the character object 184 from the slide. In this outgoing transition the graphic object 182 and the character object 184 rise off the surface of the slide until they disappear, with the character object 184 disappearing first. As with the previous slide, the "object zoom" transition for the outgoing objects may be applied to each object in an independent manner (such as each object moving, appearing, or disappearing at a different speed) and/or without regard for the objects of the next slide.

The preceding examples are illustrative of the manner in which individual objects on a slide may be differentially or independently manipulated, e.g., animated, without regard to other objects in a slide. The preceding examples, however, are not exhaustive, and it is to be understood that any animation or manipulation suitable for an object identified in a slide may be applied to that object without regard to the other objects in the slide or the objects in the previous or next slides in certain object-aware transition embodiments.

Further, as previously noted, the identification and assignment of animations may be largely automatic in some embodiments. For example, a user may design two or more sequential slides, such as by placing the desired objects on each slide in the desired locations. The user may then simply select a type of transition, such as the above-described isometric transition, for transitioning between two or more of the slides. In an automated implementation, the presentation application may, knowing only the selected transition and the type and location of the objects on the slides, assigns suitable animation direction, speeds, effects, translucencies, and other animation effects to each object being transitioned in and out.

The preceding discussion describes implementations in which the transitions between slides do not take into account what the objects are that are in the slides or whether the same object is present in both the outgoing and incoming slide. However, in certain embodiments, the object aware transition may take such object persistence in to account. For example, in certain implementations where the same object, be it a text, numeric, graphic, and/or video object, is present in consecutive slides, an animation or manipulation may be applied to the object while maintaining the object on the screen. Thus, in one implementation, an object may be present in consecutive slides (though it may be in different locations, orientations, or at a different scale in the two slides) and an animation may be applied to the object such that the object appears to move, turn, resize, and so forth to reach the appropriate size, location, and/or orientation in the second slide after the transition.

As in the previously described embodiments, the identification of the object may be performed automatically or based on user inputs. In addition, the determination that the object is present in consecutive slides, though perhaps with different size or location properties, may be performed automatically. For example, the object may be a .jpg or a .gif image which is referenced by a common file name or location (such as an image gallery or library) when placed on the first and second slides or may be a text or numeric object that contains the same characters. Thus, an automated routine may determine that the same image file or character string (word, phrase, sentence, paragraph, and so forth) is present in both slides, even if it is at different locations in the slides or at different sizes. The presentation application may then also evaluate different attributes of the common object, such as size, position, color, rotation, font, and so forth, to determine if any of these attributes that differ between slides would preclude animation from one to the other. If however, the differences are susceptible to a transitional animation, the presentation application may automatically determine an animation for the transition between slides such that the common object appears to be moved, scaled, rotated, and so forth into the proper location for the incoming slide. Thus, in this embodiment, the user may do no more than design two sequential slides with one or more objects in common and the presentation application will identify the common objects on the sequential slides and provide appropriate animated transitions for the common objects when going from the first slide to the second.

For example, turning now to FIGS. 10A-10I, a sequence of screenshots depicting a slide transition is depicted. In this example, a graphic object 182, here a stand, is present in both the outgoing and incoming slides. However, the graphic image 182 is at a different size and location in the first slide relative to the second slide. In addition, a character object 184, here the text string "Keynote", is introduced in the second slide which is not present in the first slide. In the depicted example, the graphic object 182 is animated to appear to shrink and to move upward on the screen as part of the transition between slides. In addition, the character object 184 is added during the transition. As in previous embodiments, the graphic object 182 and character object 184 may be animated or manipulated independently of one another.

In another embodiment of an object-aware transition that takes into account the persistence of objects between slides, a character-based example is provided. In this example, the actual characters, be they letters, numbers, punctuation, etc., on a slide may be evaluated for persistence between slides. That is, the characters within a text and/or numeric string may be considered to be the objects in the present context. In an automated implementation, when evaluating the character objects to determine if the character object is present in consecutive slides, the presentation application may evaluate different attributes of the character, such as the letter or number itself, the font, the font size, the color, the presence of certain emphasis (highlight, underlining, italics, bold, strikethrough, and so forth) and other attributes that may affect the similarity of the perceived character in consecutive slides. In certain embodiments, the character might be identical across the evaluated attributes to be retained or animated between slides. In other embodiments, certain attributes, such as color changes, emphases, and so forth, may still allow animation and retention of the character between slides.

In this example, while the characters may be present in consecutive slides, they need no be used in the same words or numbers, and therefore need not remain in the same order. Turning to FIGS. 11A-11F, a sequence of screenshots depicting a slide transition is depicted. In this example, the character string "Reduce" is initially displayed though, after the slide transition, the character "Reuse" will be displayed. Thus, the persistent character objects 210 "R", "e", and "u" are present in both the first and second slide, though there is an intervening "d" in one slide but not the other.

In the depicted example, the non-persistent characters are slid away and faded form view as part of the transition while the persistent character objects 210 remain in view and are slid into their new positions consistent with the word displayed on the second slide. As in previous embodiments, the character objects 210 may be animated or manipulated independently of one another. As will be appreciated, the present example depicts letters, however the characters may also be numbers, symbols, punctuation and so forth. In addition, though the present example described sliding and fading (or retaining) of the characters, in other embodiments other types of character animation may be employed. For example, instead of sliding on the screen, the transition animation may instead rotate or flip the word about a vertical or horizontal axis, with the changes to the word being accomplished during the rotation or flip of the word. Indeed, any suitable form of character animation may be employed in manipulating characters in such an embodiment.

As will be appreciated, the present techniques allow for identification of objects on slides of a presentation and the independent manipulation, such as animation, of the objects during slide transitions. As described herein, in some embodiments, no weight is given as to whether the same object or objects are present in consecutive slides. However, in other embodiments, the presence of an object or objects in consecutive slides may be noted and manipulation of the objects during slide transition may take advantage of the persistence of the objects. In certain embodiments, as described herein, the identification of objects and/or the transitional manipulation of the identified objects may be automatically derived, such as by a presentation application executing on a processor-based system.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method, comprising:
receiving, via a processor, a first slide and a second slide without animation, wherein the second slide immediately follows the first slide according to a predefined order;
identifying, via the processor, two or more text objects present on the first slide and the second slide, wherein the two or more text objects are part of a first word in the first slide and a second word in the second slide;
identifying, via the processor, one or more additional text objects present in the first slide but not present in the second slide by evaluating persistency of text objects between the first word and the second word, wherein the one or more additional text objects are part of the first word present in the first slide;
identifying, via the processor, a change in character attributes between a first set of character attributes associated with the two or more text objects in the first slide and a second set of character attributes associated with the two or more text objects in the second slide, wherein the character attributes comprise a character size, a character color, a character font, a character position, a character emphasis effect, or any combination thereof;
automatically generating, via the processor, a transition animation effect between the first slide and the second slide during a slide show presentation based on the identified change in the character attributes and the evaluated persistency of text objects between the first word and the second, wherein the transition animation effect between the first slide and the second slide comprises:
moving each of the two or more text objects from a first position of each of the two or more text objects to a second position of each of the two or more text objects using the transition animation effect for each of the two or more text objects of the first slide; and
moving the one or more additional text objects of the first slide to be out of view of the second slide, wherein the one or more additional text objects are present in the first slide and not present in the second slide; and
displaying, via the processor, the transition animation effect between the first slide and the second slide using an electronic display.

2. The method of claim 1, wherein the two or more text objects comprise two or more respective characters of the first word or the second word.

3. The method of claim 1, wherein identifying the two or more text objects comprises receiving an input from a user.

4. The method of claim 1, wherein the two or more text objects comprise individually editable components on the first slide.

5. The method of claim 1, wherein the transition animation effect comprises moving, rotating, scaling, or any combination thereof for each respective text object of the two or more text objects.

6. A system, comprising:
a display; and
a processor configured to:
receive a first slide and a second slide without animation, wherein the second slide immediately follows the first slide according to a predefined order;
identify two or more text objects configured to be depicted on the first slide and on the second slide, wherein the two or more text objects are part of a first word in the first slide and a second word in the second slide, wherein the first slide and the second slide are configured to be rendered on the display;
identify one or more additional text objects present in the first slide but not present in the second slide by evaluating persistency of text objects between the first word and the second word, wherein the one or more additional text objects are part of the first word present in the first slide;
identify a change in character attributes between a first set of character attributes associated with the two or more text objects in the first slide and a second set of character attributes associated with the two or more text objects in the second slide, wherein the character attributes comprise a character size, a character color, a character font, a character position, a character emphasis effect, or any combination thereof;
automatically generate a transition animation effect between the first slide and the second slide based on the identified change in the character attributes and the evaluated persistency of text objects between the first word and the second, wherein the transition animation effect between the first slide and the second slide comprises:
moving each of the two or more text objects from a first position of each of the two or more text objects to a second position of each of the two or more text objects using the transition animation effect for each of the two or more text objects;
moving the one or more additional text objects of the first slide to be out of view of the second slide, wherein the one or more additional text objects are present in the first slide and not present in the second slide; and
display the transition animation effect between the first slide and the second slide using the display.

7. The system of claim 6, wherein the two or more text objects comprise two or more respective characters of the first word or the second word.

8. The system of claim 6, wherein the processor is configured identify the two or more text objects based on one or more inputs from a user.

9. The system of claim 6, wherein the two or more text objects comprise individually editable components on the first slide.

10. The system of claim 6, wherein the transition animation effect comprises moving, rotating, scaling, or any combination thereof for each respective text object of the two or more text objects.

11. A non-transitory computer-readable medium comprising computer-executable instructions configured to cause a processor to:
receive a first slide and a second slide without animation, wherein the second slide immediately follows the first slide according to a predefined order;
identify two or more text objects present on the first slide and on the second slide, wherein the two or more text objects are part of a first word in the first slide and a second word in the second slide;

identify one or more additional text objects present in the first slide but not present in the second slide by evaluating persistency of text objects between the first word and the second word, wherein the one or more additional text objects are part of the first word present in the first slide;

identify a change in character attributes between a first set of character attributes associated with the two or more text objects in the first slide and a second set of character attributes associated with the two or more text objects in the second slide, wherein the character attributes comprise a character size, a character color, a character font, a character position, a character emphasis effect, or any combination thereof;

automatically generate a transition animation effect between the first slide and the second slide during a slide show presentation based on the identified change in the character attributes and the evaluated persistency of text objects between the first word and the second, wherein the transition animation effect between the first slide and the second slide comprises:

moving each of the two or more text objects from a first position of each of the two or more text objects to a second position of each of the two or more text objects using a transition animation effect for each of the two or more text objects of the first slide; and moving the one or more additional text objects of the first slide to be out of view of the second slide; and display the transition animation effect between the first slide and the second slide using the display.

12. The non-transitory computer-readable medium of claim 11, wherein computer-executable instructions configured to identify the two or more text objects comprises receiving an input from a user.

13. The non-transitory computer-readable medium of claim 11, wherein the two or more text objects comprise individually editable components on the first slide.

14. The method of claim 1, wherein the transition animation effect comprises moving, rotating, scaling, or a combination thereof for each respective object of the two or more text objects.

15. The method of claim 1, wherein the transition animation effect comprises modifying a color of each of the two or more text objects, a shape of each of the two or more text objects, a size of each of the two or more text objects, or any combination thereof.

16. The method of claim 1, comprising:
identifying, via the processor, an other text object present in the second slide but not present in the first slide;
moving the other text object onto the second slide; and
presenting the other text object on the second slide.

* * * * *